UNITED STATES PATENT OFFICE.

CHARLES J. GREENSTREET, OF INDIANAPOLIS, ASSIGNOR TO THE GERMAN-AMERICAN CHEMICAL COMPANY, OF INGALLS, INDIANA.

FERTILIZER AND PROCESS OF MAKING SAME.

SPECIFICATION forming part of Letters Patent No. 537,822, dated April 23, 1895.

Application filed August 25, 1894. Serial No. 521,337. (No specimens.)

*To all whom it may concern:*

Be it known that I, CHARLES J. GREENSTREET, a citizen of the United States, residing at Indianapolis, in the county of Marion and State of Indiana, have invented certain new and useful Improvements in Fertilizers and Process of Making Same from Waste Products of Fats; and I do hereby declare the following to be a full, clear, and exact description of the invention, such as will enable others skilled in the art to which it appertains to make and use the same.

The object of this invention is to reclaim the organic substances in "tank water," as the liquid is called that remains after rendering lard, tallow and fats by means of steam-heat. This liquid contains a large percentage of organic substances which, when properly handled, can be utilized as a valuable fertilizer.

Heretofore, to use the soluble organic substances, it has been necessary to evaporate the tank water to the consistence of a sirup commonly called "stick," and then mix the "stick" with a drier commonly known as "medicine," until no longer sticky to the touch. Then the mixture was evaporated in pans by steam heat until thoroughly dried, when it was pulverized. In order to make such a fertilizer it has been necessary to put up expensive machinery. The evaporators needed in making stick require enormous quantities of water and both evaporators and driers require so much steam that only where both fuel and water are practically free can such a fertilizer be made at a profit. Even where fuel and water are at a minimum cost many firms have had to abandon the making of such fertilizers on account of the necessary wear and tear and repair of such machinery, and the constant replacing of pans used in driers.

My object is to do away with all expensive machinery and labor and to convert by simple and practical means, such tank water direct into a dry pulverant, and permanently nitrogenous fertilizer, destroying at the start, its tendency to deliquesce and again become sticky and unfit for fertilizing purposes.

To attain this end I run the tank water direct from the rendering tanks into a receiver, and while agitating the tank water in any convenient manner, add to it a small percentage of an acid or salt, capable of retaining ammonia and of neutralizing an alkaline silicate, such as sulfuric or hydrochloric acid or sulfates or chlorids of iron, alumina, manganese, &c. As soon as these are in solution I add immediately a soluble silicate of an alkali until a neutral reaction is shown to litmus paper. The addition of the silicate immediately forms a thick, heavy, mushy, mixture which condition can be brought about by adding the silicate alone and direct to the tank water. The free soda formed however, breaks up some of the organic compounds forming free ammonia, which can be caught by distilling into an acid or by adding at the start, as stated above, an acid or a salt, capable of retaining the ammonia. The above mixture can now be dried and ground in any convenient manner. I prefer however, to run the mixture directly into a centrifugal machine which immediately throws out all of the surplus water and leaves the material dry enough to be mixed with ordinary pressed tankage and can be dried with same in an ordinary revolving drier, or can be dried separately in some kind of drier. In operating the above, I have found most convenient for working, the ordinary tank water registering 2° Baumé, about two ounces of copperas and five ounces silicate of soda being used per each gallon of tank water. However, as the proportions of solids in tank water vary, the operator should use his judgment, the only requisite being that the solution remain neutral or slightly acid.

I am aware that acids have been used with stick as a drier, and that sulfates of iron, alumina, manganese, &c., have been used in connection with "stick" as a "medicine," but I am not aware they have been used direct into the tank water for the purpose of neutralizing the alkaline reaction of a soluble silicate, thus retaining the ammonia.

In the above, I do not wish to confine myself to any special acid or salt capable of neutralizing an alkaline silicate and retaining ammonia, nor to the proportions contained herein, nor to any particular method of drying the mixture. The same reactions take place with stick and the same proportions can be used. Hence I do not wish to confine myself to unevaporated tank water.

Having thus fully described my improvement, what I claim as new, and wish to secure by Letters Patent, is—

1. A nitrogenous fertilizer composed of solids of tank water combined with a soluble silicate, substantially as described.

2. A nitrogenous fertilizer composed of the solids of tank-water, combined with a soluble silicate and a chemical agent capable of neutralizing the silicate and retaining free ammonia.

3. The herein described process of converting tank water into a fertilizer, by adding an agent capable of neutralizing the silicate and retaining free ammonia, then adding a soluble silicate and then expelling the surplus water and drying, substantially as described.

4. The herein described nitrogenous fertilizer consisting of the solids of tank water, combined with a soluble silicate of soda and with copperas, to make the reaction slightly acid or neutral.

5. The herein described nitrogenous fertilizer consisting of the solids of evaporated tank water or "stick" combined with a soluble silicate and a chemical agent capable of neutralizing the silicate and also of retaining the ammonia.

6. The herein described process of converting "stick" into a fertilizer, by adding an agent capable of neutralizing the silicate and retaining free ammonia, then adding a soluble silicate and then expelling the surplus water and drying, substantially as described.

In testimony whereof I affix my signature in presence of two witnesses.

CHAS. J. GREENSTREET.

Witnesses:
JOSEPH A. MINTURN,
W. A. BISTOR.